March 15, 1966 P. H. SHERRON 3,239,979

TELEPHONE BOOTH GROUP INSTALLATION

Filed Nov. 23, 1962

3 Sheets-Sheet 1

INVENTOR.

PERCIVAL H. SHERRON

BY

Busser, Smith & Harding

ATTORNEYS

March 15, 1966 P. H. SHERRON 3,239,979
TELEPHONE BOOTH GROUP INSTALLATION
Filed Nov. 23, 1962 3 Sheets-Sheet 2

INVENTOR.
PERCIVAL H. SHERRON
BY
Busser, Smith & Harding
ATTORNEYS

INVENTOR.
PERCIVAL H. SHERRON
BY
Busser, Smith & Harding
ATTORNEYS

United States Patent Office 3,239,979
Patented Mar. 15, 1966

3,239,979
TELEPHONE BOOTH GROUP INSTALLATION
Percival H. Sherron, Jamaica, N.Y. (% Sherron Metallic Corp., 1201 Flushing Ave., Brooklyn 37, N.Y.)
Filed Nov. 23, 1962, Ser. No. 239,530
2 Claims. (Cl. 52—234)

This invention relates generally to telephone booth constructions and more particularly to an improved construction for a group telephone booth installation.

One object of this invention is to provide a group telephone booth construction which has a common wall between the individual adjacent booths. Prior structures of this type have involved positioning the booths in adjacent side-by-side relation with each booth providing a wall of its own facing the adjacent booth. This prior construction involves structure which performs no useful function. Moreover, these prior constructions require means for preventing the collection of dirt and other foreign material in the space between the booths. The common wall construction in accordance with this invention overcomes the above-mentioned disadvantages of these prior structures.

Another object of this invention is the provision of a strong interconnection between adjacent booths which interconnection permits ease of installation and involves a simple construction.

The above and other objects and features of the invention will become apparent from the following description when read in conjunction with the accompanying drawings, in which.

Figure 1:
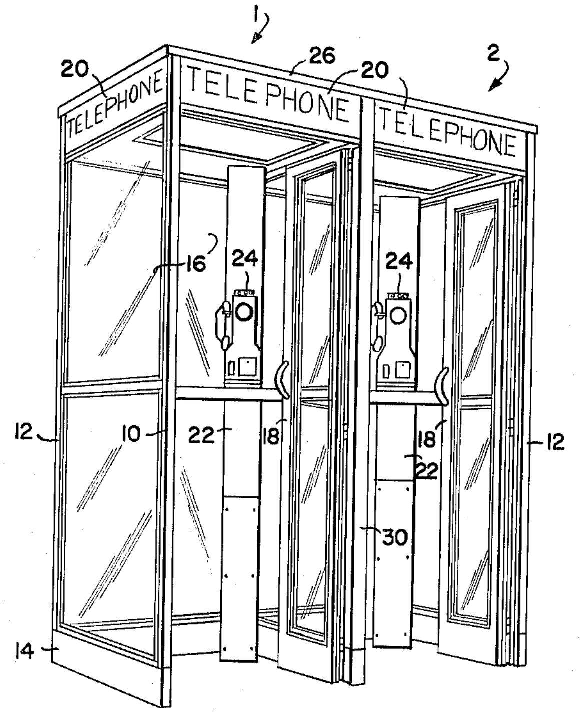
FIGURE 1 is a perspective view illustrating a group telephone booth installation embodying the features of this invention.

As shown in FIGURE 1 the group telephone booth installation in accordance with this invention comprises two booths 1 and 2 positioned in side-by-side relation and connected together to form a group installation. With the exception of the parts to be described hereafter the corner posts, doors, panels, lintels and ceilings may be of standard or any other desired construction. The base members and raceways may also be of standard construction.

Referring to FIGURE 1, each of the telephone booths 1 and 2 comprises a standard front corner post 10 and rear corner post 12, these posts being mounted on the base 14 and arranged to support the side panels 16. A conventional door assembly 18 is provided at the front of each booth. Lintels 20 extend between the corner posts above the side panels and across the top of the door assemblies. Each booth comprises a vertically extending raceway 22 located in a corner thereof, a telephone 24 being mounted on each raceway. A common roof 26 is provided for covering both of the booths 1 and 2.

Figure 2:
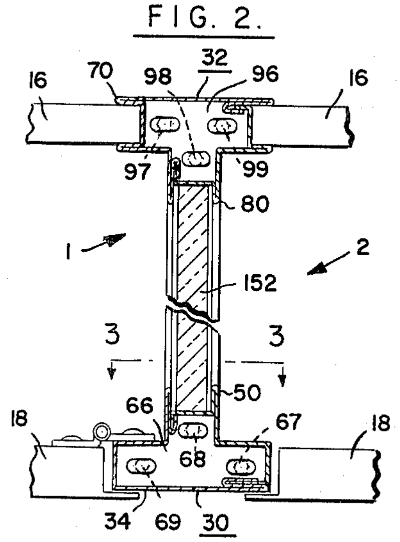
FIGURE 2 is a fragmentary sectional view of the common wall of the telephone booth installation shown in FIGURE 1.

As is best shown in FIGURE 2, there is provided a common front corner post 30 and a common rear corner post 32 between the booths 1 and 2. The corner posts 30 and 32 are mounted at the lower ends thereof on the base structure to provide a strong interconnection between the two booths 1 and 2, this mounting being more fully described hereafter. Each of the common corner posts 30 and 32 is comprised of an outer member or post shell and an inner or post liner, the liner and shell being interlocked to permit telescopic relative movement.

Figures 5, 7:
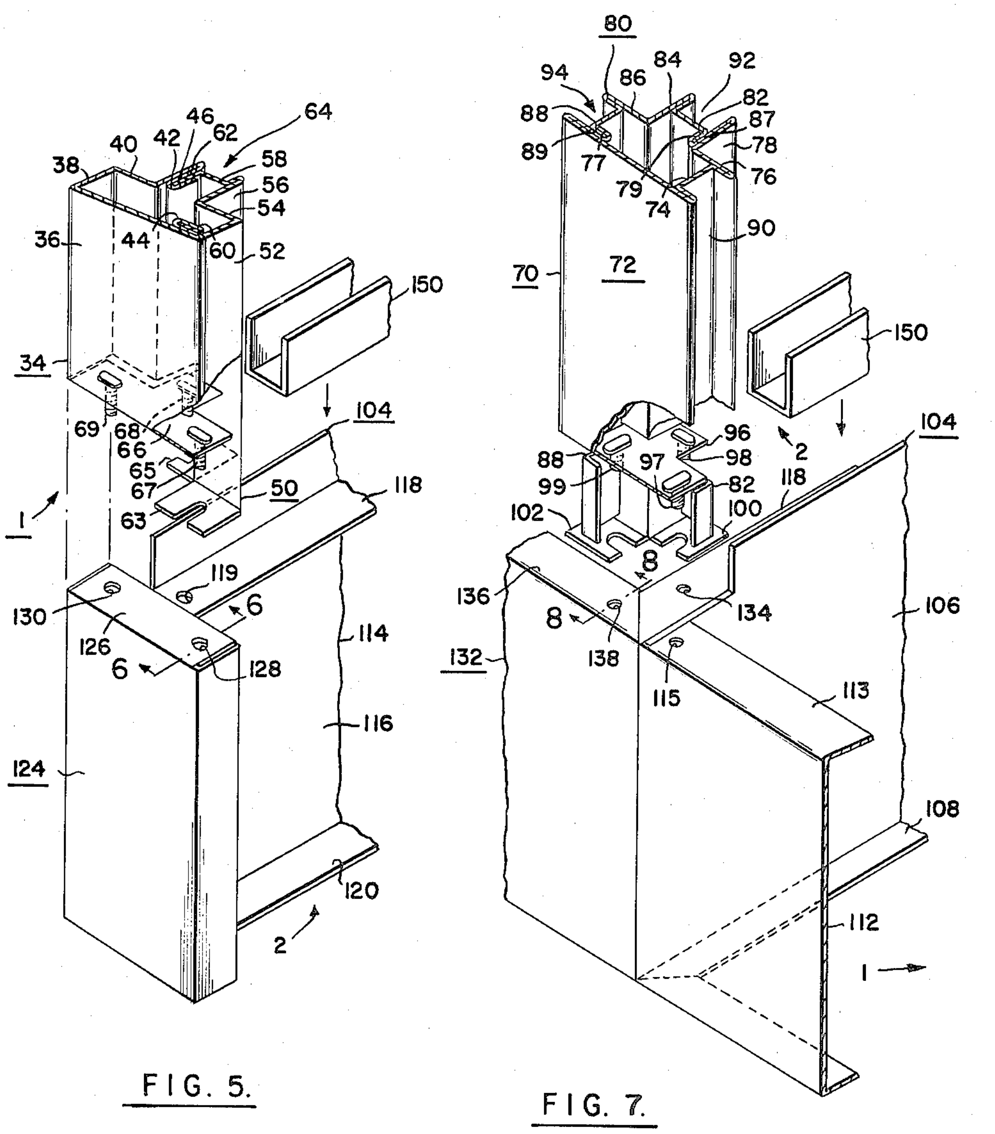
FIGURE 5 is an exploded perspective view of the front corner post between adjacent booths.
FIGURE 7 is an exploded perspective view of the rear corner post between adjacent booths.

The post shell 34 of the front corner post 30 consists of a sheet of metal bent into the configuration illustrated in FIGURES 2 and 5. Shell 34 includes four vertically extending walls 36, 38, 40 and 42 joined at right angles in the manner illustrated in the drawings. These walls define outer surfaces of the front corner of the booth. The outermost end of wall 36 is provided with a portion bent backwardly to form a vertically extending narrow channel 44. Also, the outermost end of wall 42 is provided with a portion bent backwardly to form a vertically extending narrow channel 46.

The post liner 50 of the front post 30 is made of a sheet of metal bent to the configuration shown in the drawings. Liner 50 includes four vertically extending walls 52, 54, 56 and 58. The outermost end of wall 52 is provided with a terminal portion 60 extending at right angles thereto. The outermost end of wall 58 is provided with a terminal portion 62 extending at right angles thereto. One end of wall 56 is joined with a portion bent backwardly upon the inner surface thereof and joined at right angles with the inner end of wall 58. The channels 44 and 46 defined by the backwardly bent portions of shell 34 are provided with a clearance so that these channels receive the terminal portions 60 and 62, respectively, of the liner 50 when the shell and liner are assembled. The shell 34 and liner 50 are interlocked during assembly by a relative longitudinal sliding movement with the terminal portions 60 and 62 nesting in the channels 44 and 46, respectively.

When assembled, the front post has a T-shaped cross-section and the walls 42, 58 and 56 cooperate to define a vertically extending channel 64 for receiving the front edge of the common wall between booths 1 and 2. Extending inwardly from the lower end of wall 36 of shell 34 is a T-shaped lip or flange 66. The lip 66 is shaped so as to be enclosed within the exterior walls of the front corner post. Mounted on lip 66 are three pins 67, 68 and 69 which project downwardly from the bottom wall of the lip. Each of the pins 67, 68 and 69 has a flange at its upper end and is secured to the lip 66 by suitable means such as by welding the pin flanges to the lip. The pins are threaded for cooperation with nuts as will be described hereafter.

Walls 54 and 56 are provided at their lower ends with inwardly extending flanges or lips 63 and 65. The lips 63 and 65 are provided with slots in alignment with the pins 67 and 68, respectively, when the post is assembled.

The post shell 70 of the rear corner post 32 is made of a sheet of metal bent into the configuration illustrated in the drawings. Shell 70 comprises vertically extending walls 72, 74, 76 and 78 extending at right angles with their adjoining walls. These walls define outer surfaces of the rear corner of the booth. The outer end of wall 72 is bent backwardly to define a vertically extending narrow channel 77. In a like manner, the outer end of wall 78 is bent backwardly to form a vertically extending narrow channel 79.

The liner 80 of the rear corner post 32 is made of a sheet of metal bent to the configuration illustrated in the drawings. Liner 80 comprises vertically extending walls 82, 84, 86 and 88. The outer end of the wall 82 is joined with a terminal portion 87 extending at right angles thereto. Also, the outer end of wall 88 is joined with a terminal portion 89 extending at right angles thereto.

The corner walls and rear wall of the corner post 32 are provided with backwardly bent portions to define vertically extending channels 90, 92 and 94 which are adapted to receive the sides of the telephone booth.

The narrow channels 77 and 79 of the shell 70 provide a clearance such that these channels may receive the terminal portions 89 and 87, respectively, of the liner 80. The shell and liner of corner post 32 are assembled in an interlocked condition by sliding these members together in a longitudinal direction with the terminal portions 89 and 87 nesting in the channel formations 77 and 79.

The rear corner post 32 has a T-shaped cross-section as is illustrated in the drawings with vertically extending channels 90, 92 and 94 being provided at the ends thereof. A T-shaped lip 96 is joined at the lower end of wall 72 and extends at right angles thereto into the interior of the post 32. Three pins 97, 98 and 99 are mounted on lip 96 and extend downwardly therefrom. Each of the pins 97, 98 and 99 has a flange at its upper end and is secured to lip 96 by suitable means such as by welding the pin flanges to the lip 96. The pins 97, 98 and 99 are provided with external threads. The corner walls 84 and 86 of liner 80 have flanges 100 and 102 extending at right angles from the lower ends thereof into the interior of the post 32. Each of these flanges 100 and 102 is provided with a slot in alignment with the pins 98 and 99, respectively.

There is provided a common base wall extending between the common front and rear corner posts. This common base wall comprises a channel member 104 which includes a vertical wall 106 joined at right angles at the bottom thereof with a horizontally extending flange 108. At the upper front end of the channel member 104 there is provided a horizontally extending lip 110 having a hole therein adapted to receive the pin 69 on the post shell 34. The channel member 104 forms the common base wall for booth 1 and meets the rear wall portion 112 of the base of booth 1 as is best shown in FIGURE 7. The base rear portion 112 has a horizontal flange 113 having a hole 115 arranged to receive pin 97 as will be described hereinafter.

Figure 4:
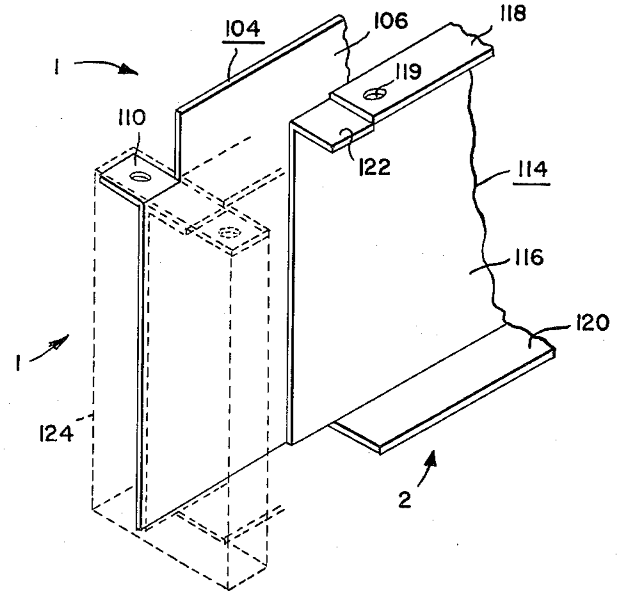
FIGURE 4 is a fragmentary perspective view illustrating the manner in which the bases of adjacent booths are joined.

The common base wall also comprises a base member 114 adjacent booth 2. This base member comprises a channel which includes a vertically extending portion 116 and horizontally extending flanges 118 and 120 at the upper and lower ends thereof, respectively. The lower flange 120 terminates short of the front end of the base member 114 as is shown in FIGURE 4. The upper flange 118 has a hole 119 adapted to receive the pin 68 on the front post shell 34. A horizontally extending lip 122 is provided at the upper front end of the base member 114. Lip 122 is in horizontal alignment with lip 110.

Figure 6:
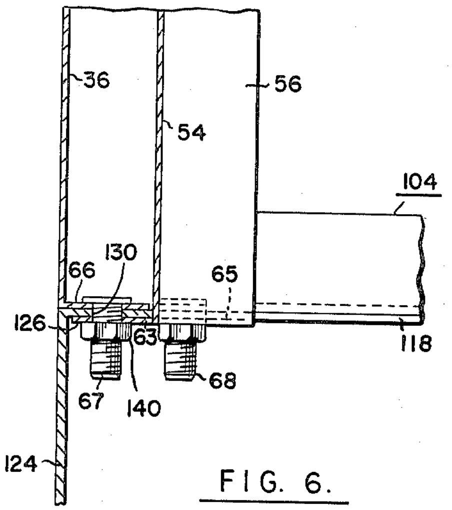
FIGURE 6 is a sectional view taken on line 6—6 of FIGURE 5.
Figure 8:
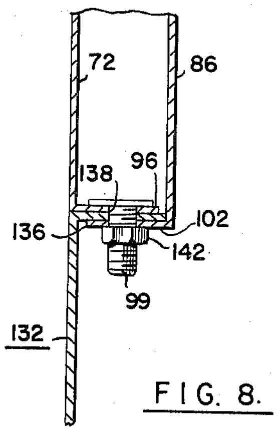
FIGURE 8 is a sectional view taken on line 7—7 of FIGURE 7.

The construction of the bases of booths 1 and 2 at the common front corner post 30 is illustrated best in FIGURES 5 and 6. This construction involves a base separator 124 which has a rectangular construction having an open side facing the front end of the common base wall. The base members 104 and 114 are inserted into the open side of the base separator 124 so that the top wall 126 of the base separator overlies the lips 110 and 122 of the members 104 and 114 with the terminal portions of the members 104 and 114 extending within the base separator. The base separator 124 is welded to the base 104 of booth 1, the weld connecting lip 110 and top wall 126. The top wall 126 of the base separator 124 is provided with a pair of holes 128 and 130 spaced so as to receive the pins 67 and 69, respectively on the post shell 34.

The construction of the bases of booths 1 and 2 at the common rear corner post 32 is shown in FIGURE 7. The base member 104 of the booth 1 and the base member 114 of booth 2 are positioned adjacent one another. Member 104 meets at right angles with the rear wall portion 112 as was described previously. Member 118 meets at right angles with a rear wall base member 132 of the base of booth 2. The upper flange 118 of base member 114 has an opening 134 for receiving the pin 98 and the upper flange 136 of base member 132 has an opening 138 for receiving the pin 99. The bases of the booths 1 and 2 are of standard construction except for the base portions 104 and 114.

The procedure of assembly of the booths 1 and 2 involves the steps of joining the shell and liner of posts 30 and 32 into their interlocked condition as is illustrated in FIGURES 5 and 7 and assembling the base members 104 and 114 with the base separator 124 as was previously described. The post shell 34 and post liner 50 are interlocked so that the lips 63 and 65 of the liner are spaced outwardly of the flange 66 of the post shell 34 as is illustrated in FIGURE 5. The post liner 50 is then positioned with the lips 63 and 65 being located respectively underneath the top wall 126 of the base separator and the flange 118 of base member 114. In this position the slots of the lips 63 and 65 are in alignment with the holes 128 and 119, respectively. The post shell 34 is then moved downwardly to insert the pins 67, 68 and 69 through the aligned openings in the base separator, the common base wall and the post liner. Accordingly, pin 67 is extended within hole 128 and the slot in lip 63, pin 68 is extended within hole 119 and the slot in lip 65, and pin 69 is extended within hole 130. Nuts 140 are then threaded onto the pins 67, 68 and 69 to secure the parts in the assembled position.

The assembly of the rear corner post 32 onto the base is similar to the front corner post assembly. In this case the rear corner post 32, with the shell and liner arranged as shown in FIGURE 7, is positioned initially with the lips 100 and 102 of the liner 80 underlying the horizontal flanges 118 and 136, respectively, of the base of booth 2. The flanges 100 and 102 are spaced from the bottom ends of wall portions 82 and 88, respectively, to provide clearance for the reception of the flanges 118 and 136. In this position the slots in the lips 100 and 102 are in alignment with the holes 134 and 138, respectively, in the horizontal flanges of the base. The post shell 70 is then moved downwardly so that the pins 97, 98 and 99 enter the aligned openings in the flanges of the bases and the slots in the lips 100 and 102 of the post liner 80. Accordingly, pin 97 is extended within hole 115 in base member 112 of booth 1, pin 98 is extended within hole 134 in base flange 118 and the slot in lip 100 of post liner 80, and pin 99 is extended within hole 138 in base flange 136 and the slot in lip 102 of post liner 80. Nuts 142 are then threaded onto the pins 97, 98 and 99 to secure the parts in the assembled condition.

The corner post arrangement in accordance with this invention provides a strong interconnection between the booths 1 and 2 comprising the group installation. Booth interconnection is provided at the front corner post by the pins 67, 68 and 69 which engage parts of both the bases of the booths 1 and 2. Pin 69 engages the lip 110 which is an integral part of the base of booth 1 and pin 68 engages the flange 118 which is an integral part of the base of booth 2. Pins 67 and 69 engage the base separator 124. Accordingly, a strong interconnection is provided at the front corner post 30.

A similar interconnection is provided at the rear corner post 32 where the pin 97 engages the rear wall 112 of the base of booth 1. The pins 98 and 99 engage base portions 114 and 132 which are part of the base of booth 2. Accordingly, an effective interconnection between booths 1 and 2 is also provided at the common rear corner post of the telephone booth installation.

Figure 3:
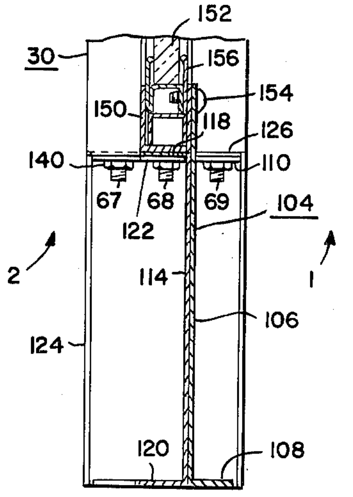
FIGURE 3 is a sectional view taken on line 3—3 of FIGURE 2.

There is provided a U-shaped channel member 150 which rests on the horizontal flange 118 of the base member 114 of booth 2 and extends between the front and rear corner posts. This member 150 provides a horizontally extending channel adapted to receive the bottom of the common wall 152 of the group telephone booth installation. The channel member 150 is secured to the upper end of the base member 104 of booth 1 by suitable mounting screws 154 as is shown in FIGURE 3. The mounting screws 154 also engage a channel forming retaining structure 156 for the reception of the usual rubber molding at the bottom of a glass panel as is well known in the art.

The arrangement by which the booths 1 and 2 are assembled provides a sturdy interconnection. Moreover, the installation of the parts may be accomplished easily and rapidly. Further, since a common wall is provided between adjacent booths, a minimum number of parts may be used.

It will be understood that various modifications and changes may be made in the construction and arrangement of parts without departing from the scope of the invention. Accordingly, it is not desired to be limited except as required by the following claims.

What is claimed is:

1. A telephone booth group installation comprising a first and second telephone booth, an upright corner post at the front of the installation common to said first and second booths, an upright corner post at the rear of the installation common to said first and second booths, an upright wall extending between said front and rear corner posts to provide a common partition between said first and second booths, and a pair of rear walls extending laterally from said rear corner post, each of said booths having a base extending around the periphery thereof for supporting the side walls of each booth, the bases of said first and second booths each having a member extending between the front and rear corner posts adjacent one another to define a joint between said bases, each base having a horizontally extending flange extending laterally from said joint at a location beneath said front corner post, said front corner post comprising a one-piece shell member and a one-piece liner member mounted together in interlocked relation, said shell member having a horizontal portion having a plurality of pins extending downwardly from the bottom of the front corner post, said horizontal portion spanning said joint between said bases at the front thereof, one of said pins extending through each of said horizontal flanges of said bases of said first and second booths in engaging relation therewith for structurally interconnecting said bases, said rear corner post having a plurality of pins extending downwardly from the bottom thereof, one of said rear corner post pins engaging each of said bases for structurally interconnecting the bases and the rear corner post.

2. A telephone booth group installation comprising a first and second telephone booth, an upright corner post at the front of the installation common to said first and second booths, an upright corner post at the rear of the installation common to said first and second booths, an upright wall extending between said front and rear corner posts to provide a common partition between said first and second booths, and a pair of rear walls extending laterally from said rear corner post, each of said booths having a base extending around the periphery thereof for supporting the side walls of each booth, the bases of said first and second booths each having a member extending between the front and rear corner posts adjacent one another to define a joint between said bases, each base having a horizontally extending flange extending laterally from said joint at a location beneath said front and rear corner posts, said front corner post comprising a one-piece shell member and a one-piece liner member mounted together in interlocked relation and movable longitudinally relative to one another, said shell member having a horizontal portion having a plurality of pins extending downwardly from the bottom of the front corner post, said horizontal portion spanning said joint between said bases at the front end thereof, one of said pins extending through each of said horizontal flanges of said bases located beneath said first corner post in engaging relation therewith for structurally interconnecting said bases at the front end of said joint, said rear corner post comprising a one-piece shell member and a one-piece liner member mounted together in interlocked relation and forming vertical channels for supporting ends of said common partition and said rear wall for each booth, said rear corner post shell member having a horizontal portion having a plurality of downwardly extending pins, said last-mentioned horizontal portion spanning said joint between said bases at the rear end thereof, said last-mentioned pins extending into engagement with the base flanges beneath said rear corner post for structurally interconnecting said bases at the rear end of said joint.

References Cited by the Examiner

UNITED STATES PATENTS

| | | | |
|---|---|---|---|
| 704,986 | 7/1902 | Tufts | 52—237 |
| 1,509,845 | 9/1924 | Roby | 52—65 |
| 2,013,763 | 9/1935 | Olsen | 52—282 |
| 2,079,635 | 5/1937 | Sharp | 52—241 |
| 2,614,664 | 10/1952 | Sherron | 52—262 |
| 2,676,420 | 4/1954 | Berg | 46—21 |
| 2,896,694 | 7/1959 | Sherron | 52—36 |
| 2,934,180 | 4/1960 | Hammitt | 52—495 |

FRANK L. ABBOTT, *Primary Examiner.*

JACOB L. NACKENOFF, *Examiner.*